(12) United States Patent
Escalier

(10) Patent No.: US 10,380,411 B2
(45) Date of Patent: Aug. 13, 2019

(54) METHOD FOR CONSTRUCTING A MODEL OF THE FACE OF A PERSON, METHOD AND DEVICE FOR POSTURE ANALYSIS USING SUCH A MODEL

(71) Applicant: ESSILOR INTERNATIONAL (COMPAGNIE GENERALE D'OPTIQUE), Charenton-le-pont (FR)

(72) Inventor: Guilhem Escalier, Charenton-le-pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 97 days.

(21) Appl. No.: 15/312,296

(22) PCT Filed: May 19, 2015

(86) PCT No.: PCT/FR2015/051315
§ 371 (c)(1),
(2) Date: Nov. 18, 2016

(87) PCT Pub. No.: WO2015/177460
PCT Pub. Date: Nov. 26, 2015

(65) Prior Publication Data
US 2017/0109568 A1  Apr. 20, 2017

(30) Foreign Application Priority Data

May 20, 2014 (FR) .................................. 14 54546

(51) Int. Cl.
*G06K 9/00* (2006.01)
*G06T 7/73* (2017.01)
(Continued)

(52) U.S. Cl.
CPC ..... *G06K 9/00248* (2013.01); *G06K 9/00275* (2013.01); *G06T 7/73* (2017.01);
(Continued)

(58) Field of Classification Search
CPC ........... G06T 2207/30201; G06T 19/20; G06T 17/00; G06K 9/00221; G06K 9/00268; G06K 9/00288; G06K 9/00302
See application file for complete search history.

(56) References Cited

U.S. PATENT DOCUMENTS

| 8,180,112 | B2 * | 5/2012 | Kurtz | G06K 9/00288 |
| | | | | 382/103 |
| 2003/0202686 | A1 * | 10/2003 | Rowe | G06T 9/001 |
| | | | | 382/118 |

(Continued)

FOREIGN PATENT DOCUMENTS

| CN | 1870005 | 11/2006 |
| CN | 101383055 | 3/2009 |

(Continued)

OTHER PUBLICATIONS

Zakaria Ajmal et al.: "Learning a face model for tracking and recognition", 2002 IEEE International Conference on Acoustics, Speech, and Signal Processing. Proceedings. (ICASSP). Orlando, FL, May 13-17, 2002; [IEEE International Conference on Acoustics, Speech, and Signal Processing (ICASSP)], New York, NY : IEEE, US, May 13, 2002 (May 13, 2002), pp. IV-3612, XP032015622, ISBN: 978-0-7803-7402-7, DOI: 10.1109/ICASSP.2002.5745437.

(Continued)

Primary Examiner — Wesley J Tucker
(74) Attorney, Agent, or Firm — Young & Thompson

(57) ABSTRACT

Disclosed is a method for constructing a model of a face, including: locating (L) a single plurality of characteristic points of the face, forming a corresponding plurality of specific models of the face each including the positions of the characteristic points of the face of the person at the time associated with the specific model in question; adjusting (A) by determining, for each specific model of the face, a model adjusted relative to a reference model of the face of the (Continued)

person, the adjusted model being obtained in accordance with the specific model in question such that the distance between the adjusted model and the reference model is minimal according to a given metric; and constructing (C), from the adjusted models obtained during the adjustment step (A), the model of the face of the person. Also disclosed are methods and devices for posture analysis using such a constructed model.

19 Claims, 2 Drawing Sheets

(51) Int. Cl.
*G06T 7/80* (2017.01)
*G06T 17/00* (2006.01)
*G06T 19/20* (2011.01)
*H04N 13/239* (2018.01)

(52) U.S. Cl.
CPC ............... *G06T 7/85* (2017.01); *G06T 17/00* (2013.01); *G06T 19/20* (2013.01); *H04N 13/239* (2018.05); *G06T 2207/10021* (2013.01); *G06T 2207/30201* (2013.01)

(56) References Cited

U.S. PATENT DOCUMENTS

| | | | | |
|---|---|---|---|---|
| 2006/0269143 | A1* | 11/2006 | Kozakaya | G06K 9/00208 382/218 |
| 2013/0073114 | A1* | 3/2013 | Nemat-Nasser | B60W 40/09 701/1 |
| 2013/0136302 | A1 | 5/2013 | Nam et al. | |

FOREIGN PATENT DOCUMENTS

| | | |
|---|---|---|
| CN | 101561710 | 10/2009 |
| CN | 101593365 | 12/2009 |
| CN | 102034079 | 4/2011 |
| CN | 102222363 | 10/2011 |
| CN | 102271241 | 12/2011 |
| CN | 102402691 | 4/2012 |
| CN | 102663818 | 9/2012 |
| CN | 103093498 | 5/2013 |
| CN | 103116902 | 5/2013 |
| CN | 103136744 | 6/2013 |
| CN | 103208133 | 7/2013 |

OTHER PUBLICATIONS

Cootes T F et al.: "Active shape models—their training and application", Computer Vision and Image Understanding, Academic Press, US, vol. 61, No. 1, Jan. 1, 1995 (Jan. 1, 1995), pp. 38-59, XP002607166, ISSN: 1077-3142, [retrieved on Apr. 24, 2002], DOI: 10.1006/CVIU.1995.1004.

Volker Blanz et al.: "A Morphable Model for the Synthesis of 3D Faces", pp. 187-194.

Fan Liu et al.: "A Genome-Wide Association Study Identifies Five Loci Influencing Facial Morphology in Europeans", PLOS Genetics, Sep. 2012 | vol. 8 | Issue 9. GWAS Human Face.

International Search Report, dated Aug. 24, 2015, from corresponding PCT application.

Chinese Office Action for Application No. 201580026314.1, dated Jan. 30, 2019, with English translation provided.

\* cited by examiner

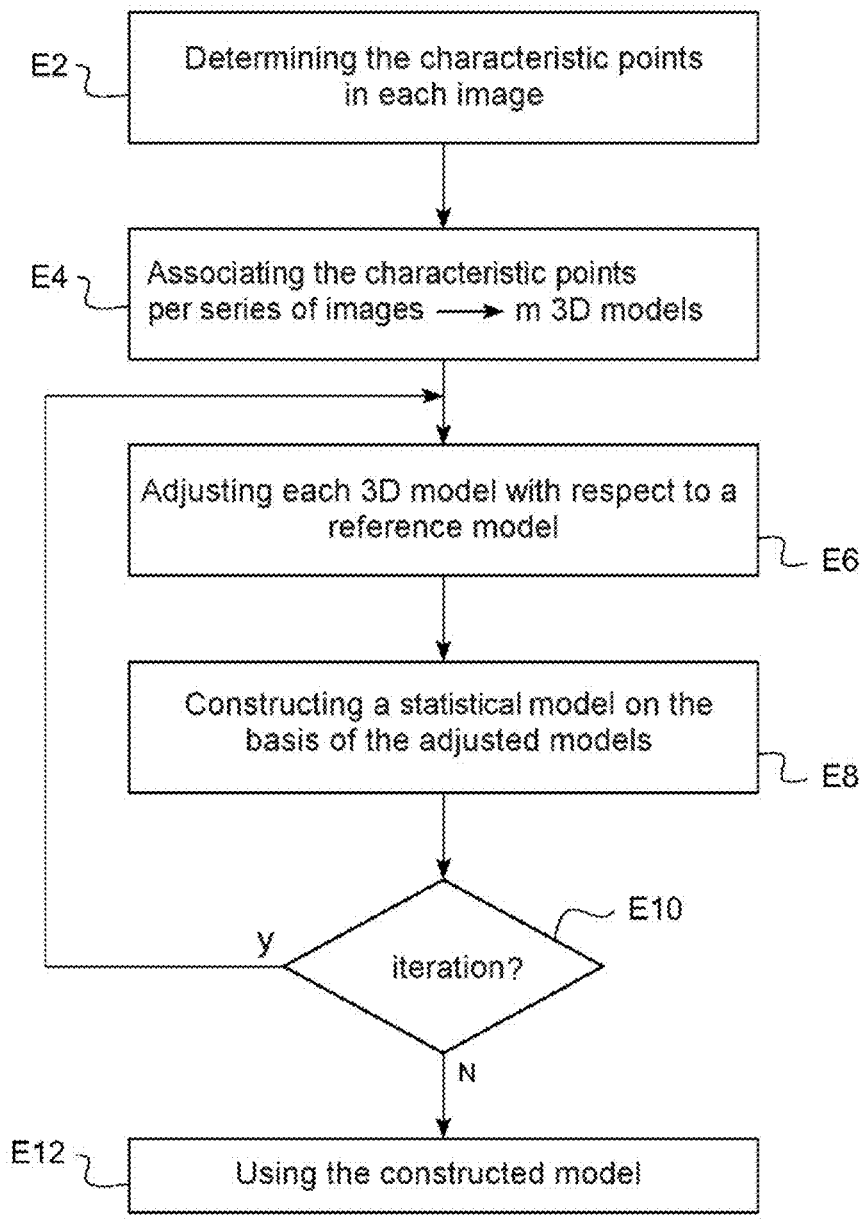

METHOD FOR CONSTRUCTING A MODEL OF THE FACE OF A PERSON, METHOD AND DEVICE FOR POSTURE ANALYSIS USING SUCH A MODEL

TECHNICAL FIELD OF THE INVENTION

The present invention generally relates to the field of ophthalmic optics.

It more particularly relates to a system for taking measurements without a clip and, in this context, it proposes a method for constructing a model of the face of an individual.

It also relates to a method and a unit for analyzing posture using the constructed model.

PRIOR ART

In systems for taking measurements on the face of an individual (of particular use in the production of ophthalmic glasses adapted to this face), a clip is conventionally used as a frame of reference for determining the dimensions of the measurements.

Specifically, such a clip has the particular advantages of being calibrated and non-deformable, thereby making it a particularly robust frame of reference.

In order to facilitate taking measurements, it would nonetheless be desirable to be able to do away with the use of a clip, which would involve the possibility of the face itself serving as a frame of reference.

This solution nonetheless seems difficult to envisage due to the following two problems: on the one hand, faces obviously vary from one person to the next; on the other hand, the face is not fixed, but may be deformed (depending on facial expressions, in particular).

SUBJECT OF THE INVENTION

In this context, the present invention proposes a method for constructing a model of the face of an individual, comprising:
  a localization step consisting of localizing, by means of an acquisition device and at each time of a plurality of acquisition times, one and the same plurality of points characteristic of said face of the individual so as to form a corresponding plurality of particular models of said face of the individual, each comprising the positions of said points characteristic of the face of the individual at the time associated with the particular model in question;
  an adjustment step consisting of determining, for each particular model of said face of the individual, a model adjusted with respect to a reference model of said face of the individual, the adjusted model being obtained on the basis of the particular model in question such that the distance between the adjusted model and the reference model is minimal in the sense of a given metric; and
  a construction step consisting of constructing, from the adjusted models obtained in the adjustment step, said model of the face of the individual.

A model of the face is thus obtained which may serve as a metrological frame of reference despite the possible deformations of the face in the various particular models; the constructed model nonetheless remains consistent with the various localized particular models by virtue of the adjustment step.

In practice, said reference model may be one of said particular models.

In order to obtain an even more precise model, the following steps may potentially be envisaged:
  the localization, adjustment and construction steps are carried out a first time in order to determine, from said particular models determined in the localization step, first adjusted models and to construct a first model of said face of the individual;
  the adjustment step is carried out a second time, using said first model of the face of the individual as a reference model, in order to determine, for each particular model, a second model adjusted with respect to said reference model; and
  the construction step is carried out a second time on the basis of the second adjusted models obtained in the second adjustment step.

The model of the face, the reference model, the particular models and the adjusted models are, for example, three-dimensional models; the positions of the characteristic points may then also be three-dimensional.

According to one possible implementation, the acquisition device may comprise at least two image capture devices, each suitable for capturing at least one two-dimensional image of said face of the individual on a sensitive surface of pixels; the localization step may then comprise the following steps:
  an image acquisition step consisting of acquiring, by means of said image capture devices, series of at least two two-dimensional images captured simultaneously by said at least two image capture devices, respectively, during the times of said plurality of acquisition times;
  an analysis step consisting, for each characteristic point of said plurality of characteristic points and for each time of the plurality of acquisition times, of identifying the characteristic point in question in the images of the series associated with the acquisition time in question in order to determine the respective positions of the characteristic point in question in these images, and of determining the three-dimensional position of the characteristic point in question on the basis of said respective positions.

The construction method may additionally comprise a calibration step, prior to said image acquisition step, consisting of calibrating said at least two image capture devices, so as to determine, for each pixel in question of a plurality of pixels of the sensitive surface of one of said at least two image capture devices:
  at least one pixel of the sensitive surface of the other of said at least two image capture devices corresponding to said pixel in question;
  a correspondence relationship between said pixel in question and said at least one corresponding pixel;
  said correspondence relationship allowing, from the respective positions of said pixel in question and of said at least one corresponding pixel on the respective sensitive surfaces of said at least two image capture devices, the three-dimensional position of the point in space associated with said pixel in question to be determined.

The calibration step is, for example, a step of defining an epipolar geometry of said at least two image capture devices which each capture a two-dimensional image of the face of the individual, said epipolar geometry matching each pixel in question of the sensitive surface of one of said at least two image capture devices with a corresponding set of at least two pixels of the sensitive surface of the other of said at least two image capture devices, said at least two corresponding pixels being located on the epipolar line corresponding to said pixel in question in the epipolar geometry defined in this definition step.

It is also possible to envisage that, in the analysis step, each plurality of points characteristic of said face of the individual in each of said at least two two-dimensional images of the series in question is localized by a facial recognition method for recognizing said face of the individual.

As a variant, the acquisition device may be a device for capturing three-dimensional representations; direct obtention is then possible by virtue of this device.

Additionally, it is possible to envisage that, in the adjustment step, each (for example three-dimensional) model adjusted with respect to said (for example three-dimensional) particular model is obtained by executing, in successive iterations, translational and rotational movements on said (three-dimensional) particular model in order to minimize the distance between said (three-dimensional) reference model and said three-dimensional adjusted model.

The model of the face of the individual generated in the construction step comprises, for example, a plurality of positions, each obtained as the barycenter of positions of a given characteristic point in multiple adjusted models. Such a barycenter may be an isobarycenter, or a barycenter calculated by weighting said (for example three-dimensional) positions in multiple (potentially three-dimensional) adjusted models with a weighting coefficient.

It is also possible to envisage, after the construction step, a step of extracting at least one head posture parameter of said individual from a representation of the face of the individual and from said constructed model of the face of the individual; potentially, multiple postures are thus extracted, each head posture being associated with a two-dimensional particular image of the face of the individual.

At least one item of postural or behavioral information on the individual may also be deduced from at least one (for example three-dimensional) representation of the face of the individual and from said (for example three-dimensional) constructed model of the face of the individual, the information being from among the following: the pantoscopic angle, the position of the center of rotation of the eye (CRO), the eye/head coefficient, the head cap or the dynamic oscillations of the posture.

According to one conceivable embodiment, data representative of the positions of said points characteristic of the face of the individual are memorized, in conjunction with an identifier of the individual, in an electronic storage device.

Additionally, it is possible to envisage that the localization step is implemented by a processing unit and that the adjustment and construction steps are implemented by a remote computer, designed to exchange data with the processing unit through the Internet and capable of thus receiving, for example, the data representative of the positions of the characteristic points in order to carry out the adjustment and construction steps on the basis of these data.

The invention also proposes a unit for analyzing the posture of a face, comprising a device for acquiring a plurality of representations of the face of an individual, means (for example a programmed device) designed to implement a method for constructing a model of the face, such as proposed above, using the acquisition device, and means (for example the same programmed device) designed to extract, using the constructed model of the face, at least one parameter representative of a posture of the face from at least one of said representations.

The invention additionally proposes a method for analyzing the posture of a face, comprising the following steps:
acquiring a plurality of representations of the face of an individual;
constructing a model of the face, through a method such as proposed above, using said representations;
extracting, using the constructed model of the face, at least one parameter representative of a posture of the face on the basis of at least one of said representations.

Lastly, the invention proposes a method for analyzing the posture of a face, comprising the following steps:
acquiring a plurality of representations of the face of an individual;
localizing characteristic points in the acquired representations by means of a processing unit;
transmitting data representative of the characteristic points from the processing unit to a remote computer;
constructing, via the remote computer, a model of the face of the individual on the basis of the representative data;
extracting, via the remote computer, at least one posture parameter on the basis of the representative data using the constructed model.

DETAILED DESCRIPTION OF ONE EXEMPLARY EMBODIMENT

The description which follows with regard to the appended drawings, given by way of non-limiting examples, will clearly elucidate the essence of the invention and the manner in which it may be carried out.

In the appended drawings:

FIG. 2 shows the main steps of an exemplary method in accordance with the teachings of the invention;

Figure 3:
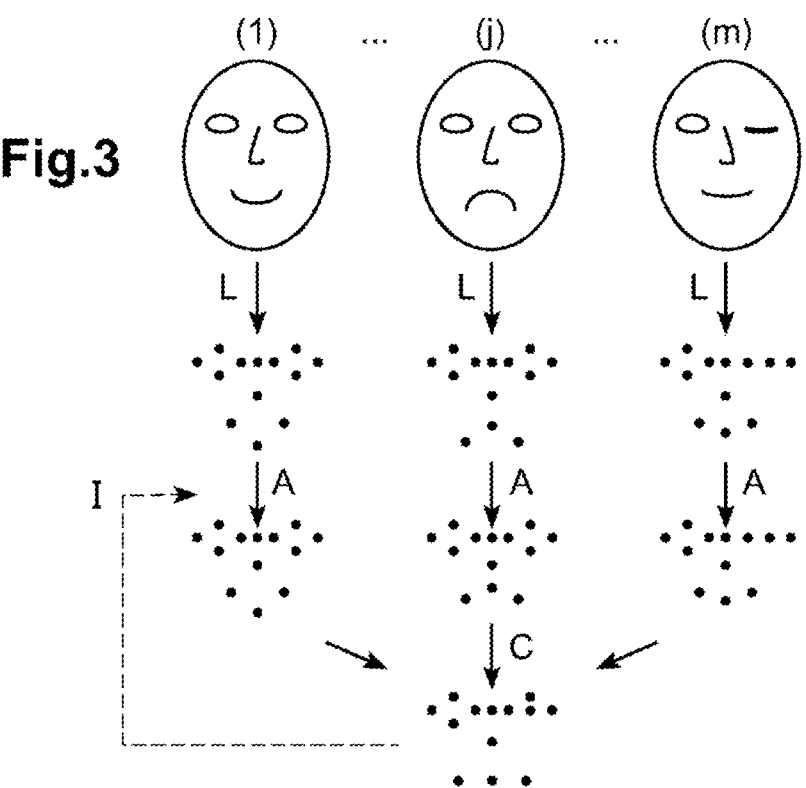

FIG. 3 schematically illustrates the models processed in the context of the invention.

Figure 1:
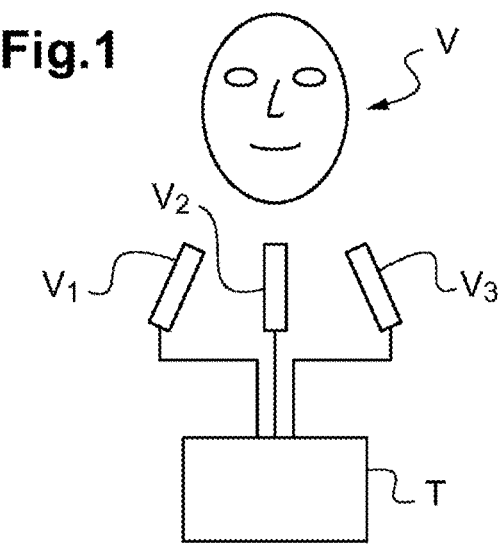
FIG. 1 represents a system for taking measurements.

FIG. 1 shows a system for taking measurements on the face V of an individual. This system comprises, in particular, n video cameras $V_i$ (n=3 in the embodiment shown in FIG. 1) and a processing unit T connected to each of the n cameras $V_i$.

The processing unit T is for example based on a microprocessor architecture. In such a system, the microprocessor executes instructions of a program memorized in a memory associated with the microprocessor in order to implement processing methods such as those presented below.

The processing unit additionally comprises, for example, a screen, a user interface (such as a keyboard or a mouse) and an electronic storage device such as a hard disk. These components are connected to the microprocessor and are controlled by the microprocessor by way of the execution of dedicated instructions by the microprocessor.

The video cameras $V_i$ are calibrated using a standard and with respect to one another, this meaning that, in an imaging plane in which the individual will position his face, the n video cameras $V_i$ acquire images representing the same zone.

Each video camera $V_i$ acquires a sequence of two-dimensional images $1_i(t_1), \ldots, 1_i(t_m)$ taken respectively at times $t_1, \ldots, t_m$.

An exemplary method in accordance with the teachings of the invention is now shown with reference to FIG. 2.

Such a method aims to construct a three-dimensional model of the face of an individual, in this instance based on the sequences of two-dimensional images taken by the cameras $V_i$.

As mentioned above, each of the steps described below is, in this instance, implemented by the microprocessor of the processing unit T on the basis of instructions memorized in a memory associated with the microprocessor; the data processed by the microprocessor (such as the images taken by the cameras or the coordinates of the characteristic points in the various models) are also memorized in this memory or in another memorization means, such as a hard disk.

In a first step E2, in each image $l_i(t_j)$ a plurality of p points characteristic of the face shown in the image in question are determined. The p points determined, in an image $l_i(t_j)$, as corresponding to the p characteristic points of the face are denoted by $Q_{i,j}(1), \ldots, Q_{i,j}(p)$. The processing unit then, for example, memorizes the (two-dimensional) coordinates of each of the characteristic points in the image in question.

The characteristic points are, for example, determined using a facial recognition algorithm, in this instance an "Active Appearance Model" algorithm (on this subject see, for example, the article "Active appearance models", by T. F. Cootes, G. J. Edwards, C. J. Taylor, in IEEE Transactions on Pattern Analysis and Machine Intelligence 23 (6): 681, 2011).

A step E4 is subsequently carried out in which the characteristic points of each series of images $l_1(t_j), \ldots, l_n(t_j)$, i.e. of each set of n images taken by the n cameras $V_i$ at a given time $t_j$, are associated in order to obtain, for each series of images, a three-dimensional model of the face, namely a set of localizations of the points characteristic of the face, said localizations being defined by three-dimensional coordinates.

More precisely, for each point k characteristic of the face and for each series of images $l_1(t_j), \ldots, l_n(t_j)$ (corresponding to the images taken at a time $t_j$), the coordinates of the points $Q_{i,j}(k), \ldots, Q_{n,j}(k)$ in these images are used in order to evaluate the three-dimensional coordinates of the point $P_k(t_j)$ at which the point k characteristic of the face is located at the time $t_j$, for example using epipolar geometry (and by virtue of the aforementioned calibration of the cameras $V_i$).

It will be noted here that, because the face of the individual is movable and deformable, the three-dimensional model obtained (defined by the set of points $P_k(t_j)$ at a time $t_j$) varies according to the time $t_j$ in question.

Next, a step E6 is carried out in which each three-dimensional model obtained in the preceding step is adjusted with respect to a reference model.

In the embodiment described here, the three-dimensional model associated with the time $t_1$ is used as a reference model in the first iteration of step E6. As a variant, another three-dimensional model obtained in step E4 could be used as reference model in the first iteration of step E6.

For each three-dimensional model (associated with the image capture at the time $t_j$), the adjusting step is carried out in this instance by minimizing the Euclidean distance between the point cloud of the three-dimensional model in question and the point cloud of the three-dimensional reference model, through translational and rotational movements in the space of the point cloud of the three-dimensional model in question.

Thus, if the points of the reference model are denoted by $R_1, \ldots, R_p$ (for the first iteration, as already mentioned, the model associated with the time $t_1$ is used, namely $R_k = P_k(t_1)$ for k ranging from 1 to p), the transformation F (composed of a translational and a rotational movement) is therefore sought that minimizes the Euclidean distance between the point cloud $R_k$ of the reference model and the point cloud of the model in question after transformation, i.e. that minimizes:

$\Sigma_{k=1}^{P} d(F(P_k(t_j)), R_k)$, where d is the (Euclidean) distance between two points.

The points of the adjusted model (i.e. after adjustment) will be denoted by $P'_k(t_j)$:

$$P'_k(t_j) = F(P_k(t_j)).$$

The points of the adjusted model (or, equivalently, of the transformation F) are, for example, determined by means of an iterative closest point (ICP) algorithm (on this subject see, for example, the article "*Comparing ICP Variants on Real-World Data Sets*" by F. Pomerleau, F. Colas, R. Siegwart and S. Magnenat in Autonomous Robots, 34(3), pages 133-148, April 2013).

A step E8 of constructing a statistical model formed from a set of points $S_k$ is then carried out on the basis of the adjusted models, each of which is formed from the points $P'_k(t_j)$. More precisely, each point $S_k$ of the statistical model is constructed on the basis of the points $P'_k(t_1), \ldots, P'_k(t_m)$ at which a given characteristic point k of the face is located at the various times $t_1, \ldots, t_m$ of image capture.

For each point k characteristic of the face, the point $S_k$ of the statistical model is, for example, defined as the isobarycenter of the corresponding points $P'_k(t_1), \ldots, P'_k(t_m)$ in the various adjusted models.

According to one possible embodiment, the aberrant points may be rejected: in order to define $S_k$, the isobarycenter of the points $P'_k(t_j)$ is determined anew, but without taking into account the points too distant from the first calculated isobarycenter (the isobarycenter calculated on the basis of the m points $P'_k(t_j)$, for example those points located at a distance from the first calculated isobarycenter that is beyond a threshold. It is proposed, in this instance, to use the mean plus two standard deviations as threshold in the distribution of the distances of the various points at the first calculated isobarycenter.

As a variant, the point $S_k$ of the statistical model may be constructed as the barycenter of the points $P'_k(t_1), \ldots, P'_k(t_m)$ weighted by a coefficient, for example relating to:
  the residual error of the point after adjustment (i.e. the Euclidean distance between the point $P'_k(t_j)$ in question after adjustment and the associated reference point $R_k$);
  an error coefficient determined during the recognition of the points characteristic of the face in step E2 (the recognition of certain points possibly being more or less certain depending on the position of the face).

Moreover, it is proposed to use in this instance, in the statistical model, only the points $S_k$ for which the uncertainty is low. The sum of the mean and two times the standard deviation of the distribution formed from the distances between the point $S_k$ determined as indicated above and the various corresponding points $P'_k(t_j)$ in the adjusted models are, for example, used as a measure of the uncertainty (for each value of k).

Only points $S_k$ for which this measure of uncertainty is lower than a predetermined threshold are retained in the rest of the processing. If this condition does not allow three points to be retained, the three points having the smallest measure of uncertainty are retained.

This allows the points that are most stable and most characteristic of the processed face to be selected and thus the robustness of the model to be increased, thus allowing the model to deliver a stable and precise metrological frame of reference.

As a variant, the user (for example an optician) could be allowed to choose (by interactive selection, for example by means of the screen and user interface of the processing unit T) the points $S_k$ that are the most representative, or to give a weighting to each of the points $S_k$.

According to another variant, all of the points $S_k$ could be used in the statistical model, each point $S_k$ being determined from the m corresponding points $P'_k(t_j)$ in the m adjusted models.

The statistical model obtained in the first iteration of step E8 may be used as a metrological frame of reference. However, it is also possible to minimize the adjusting errors, as will be explained now.

In this case, it is determined in step E10 whether a new iteration of steps E6 and E8 is necessary. To do this, a merit function equal to the mean of the uncertainty measurements obtained for the set of points $S_k$ retained in step E8 is calculated, for example.

If it is determined in step E10 that a new iteration of steps E6 and E8 must be implemented (for example because the merit function just calculated is higher than a predefined threshold and because a predetermined number of iterations has not been reached), the method repeats step E6, this time using the statistical model obtained in the last iteration of step E8 as a reference model. Therefore, step E6 is implemented using, for the points $S_k$ for which the uncertainty is low: $R_k=S_k$. (As mentioned above, it is proposed in this instance that the other points—having a high degree of uncertainty—are no longer used in the remainder of the processing.)

Step E8 is subsequent to step E6, as already explained above.

If it is determined in step E10 that a new iteration of steps E6 and E8 is not necessary (for example because the merit function just calculated is lower than or equal to the predefined threshold or because the predetermined number of iterations has been reached), it is possible to use the last statistical model obtained in step E8 as a metrological frame of reference (step E12).

A measurement is taken, for example, on the face in the metrological frame of reference just described. It will be noted that such a measurement is possible by virtue of the calibration of the video cameras $V_i$. The measurements obtained by taking the measurement could be used in the production of glasses (for example ophthalmic glasses).

Step E12 in which the metrological frame of reference (or model of the face) is used may also include a step of extracting posture parameters, or behavioral parameters when the variation in posture over time is considered, of the individual (postural or behavioral information). These parameters include, for example, the pantoscopic angle, the position of the center of rotation of the eye (CRO), the eye/head coefficient, the head cap (which corresponds to the offset of the sagittal plane with respect to the fixation of the gaze), or else the dynamic variations (for example the oscillations) of the posture.

These parameters are extracted from representations of the face (for example two-dimensional images or three-dimensional representations) in which the face may assume various postures; these may potentially be representations acquired and used (in particular in step E2) for constructing the model of the face as described below.

The extraction of the parameters representative of the posture is, for example, carried out by comparing one or more of these representations of the face with the model (or frame of reference) constructed in steps E2 to E10 as described above, this model representing a reference posture (for example "gaze into the distance", "face vertical", "natural position").

In particular, the characteristic points $P_k(t_j)$ determined in step E4 for various times $t_j$ may be used in order to determine, through comparison with the constructed model (or frame of reference), the dynamic variations of the posture in the constructed frame of reference.

The characterization of posture (or of the variation in posture) by these posture parameters allows the positioning of the eyes of the individual within the environment to be deduced; the positioning of the eyes within the environment may itself be used to define design parameters for ophthalmic lenses (for example the lenses of glasses intended for the individual), thereby allowing the design of these ophthalmic lenses to be optimized for the individual in question.

The processing carried out by the method of FIG. 2 is schematically shown in FIG. 3. It will be noted that the objects (face, models of the face) are shown in two dimensions in FIG. 3 for clarity of the disclosure, but are three-dimensional in the processing carried out by the method of FIG. 2.

As can be seen in FIG. 3, the method comprises the localization L of p points $P_k(t_j)$ characteristic of the face at m separate times $t_j$. This localization L is carried out by steps E2 and E4 of the method of FIG. 2.

A number m of three-dimensional models (each formed by these p characteristic points) is thus obtained.

Each three-dimensional model is then adjusted A by making it as similar as possible to a reference model (the first three-dimensional model in this instance). This corresponds to step E6 described above.

A number m of adjusted three-dimensional models (formed from the points $P'_k(t_j)$) is then obtained.

A statistical model (formed from the points $S_k$) may then be constructed C on the basis of the m adjusted three-dimensional models. This corresponds to step E8 described above.

The obtained statistical model may then be used as a metrological frame of reference, or the adjustment A and construction C steps may be iterated anew I in order to refine the result.

In the embodiment described above, the method shown in FIG. 2 is implemented by the processing unit T.

As a variant, it is possible to envisage that certain steps are implemented by another unit, for example a remote computer designed to exchange data with the processing unit, typically via the Internet.

In order to do this, the processing unit T comprises, for example, a communication module connected to a computer network and which allows data to be exchanged via the Internet, in particular with the remote computer.

Thus, the localization step is, for example, implemented by the processing unit and data representative of the positions of said points characteristic of the face of the individual, obtained in the localization step, are memorized, potentially in conjunction with an identifier of the individual, in an electronic storage device of the processing unit.

These data may subsequently be transmitted to the remote computer by means of the communication module. The remote computer may then implement, on the basis of the positions of the points characteristic of the face of the individual that are represented by the data it has received, the steps of adjusting and constructing the model of the face of the individual, potentially also along with the step of extracting at least one posture parameter, using the constructed model and on the basis of the received data.

The invention claimed is:

1. A method for constructing a model of a face of an individual, the method comprising:
   a localization step of localizing, by an acquisition device and at each time of a plurality of acquisition times, one and the same plurality of points characteristic of said face of the individual to form a corresponding plurality of particular models of said face of the individual, each of the particular models of the face comprising the positions of said points characteristic of the face of the individual at the time associated with the respective particular model;
   an adjustment step of determining, for each particular model of said face of the individual, a model adjusted with respect to a reference model of said face of the individual, the adjusted model being obtained on the basis of the respective particular model such that the distance between the adjusted model and the reference model is minimal in the sense of a given metric; and
   a construction step of constructing, by one or more processing devices, from the adjusted models, said model of the face of the individual, the model of the face of the individual comprising a plurality of positions each obtained as the barycenter of positions of a given characteristic point in a plurality of the adjusted models.

2. The construction method as claimed in claim 1, wherein said reference model is one of said particular models.

3. The construction method as claimed in claim 1, wherein:
   the localization, adjustment, and construction steps are carried out a first time in order to determine, from said particular models determined in the localization step, first adjusted models and to construct a first model of said face of the individual,
   the adjustment step is carried out a second time, using said first model of the face of the individual as a reference model, in order to determine, for each particular model, a second model adjusted with respect to said reference model, and
   the construction step is carried out a second time on the basis of the second adjusted models obtained in the second adjustment step.

4. The construction method as claimed in claim 1, wherein the model of the face, the reference model, the particular models, and the adjusted models are three-dimensional, and
   wherein the positions of the characteristic points are three-dimensional.

5. The construction method as claimed in claim 4, wherein the acquisition device comprises at least two image capture devices, each of the at least two image capture devices being configured to capture at least one two-dimensional image of said face of the individual on a sensitive surface of pixels, and
   wherein the localization step comprises the following steps:
      an image acquisition step of acquiring, by said image capture devices, a series of at least two two-dimensional images captured simultaneously by said at least two image capture devices, respectively, during the times of said plurality of acquisition times, and
      an analysis step, for each respective characteristic point of said plurality of characteristic points and for each respective acquisition time of the plurality of acquisition times, of identifying the respective characteristic point in the images of the series associated with the respective acquisition time in order to determine the respective positions of the respective characteristic point in the images, and of determining the three-dimensional position of the respective characteristic point on the basis of said respective positions.

6. The construction method as claimed in claim 5, further comprising a calibration step, prior to said image acquisition step, of calibrating said at least two image capture devices to determine, for each respective pixel of a plurality of pixels of the sensitive surface of one of said at least two image capture devices:
   at least one pixel of the sensitive surface of the other of said at least two image capture devices corresponding to said respective pixel, and
   a correspondence relationship between said respective pixel and said at least one corresponding pixel, said correspondence relationship allowing, from the respective positions of said respective pixel and of said at least one corresponding pixel on the respective sensitive surfaces of said at least two image capture devices, the three-dimensional position of the point in space associated with said respective pixel to be determined.

7. The construction method as claimed in claim 5, wherein, in the analysis step, each plurality of points characteristic of said face of the individual in each of said at least two two-dimensional images of the respective series is localized by a facial recognition method for recognizing said face of the individual.

8. The construction method as claimed in claim 1, wherein the barycenter is determined by weighting the positions of the given characteristic point in the plurality of adjusted models with a corresponding weighting coefficient.

9. The construction method as claimed in claim 1, further comprising:
   after the construction step, a step of extracting at least one head posture parameter of said individual from a representation of the face of the individual and from said constructed model of the face of the individual.

10. The construction method as claimed in claim 1, wherein at least one item of postural or behavioral information on the individual is deduced from at least one representation of the face of the individual and from said constructed model of the face of the individual, the information being from among the following: the pantoscopic angle, the position of the center of rotation of the eye (CRO), the eye/head coefficient, the head cap, and the dynamic oscillations of the posture.

11. The construction method as claimed in claim 1, wherein data representative of the positions of said points characteristic of the face of the individual are memorized, in conjunction with an identifier of the individual, in an electronic storage device.

12. The construction method as claimed in claim 1, wherein the localization step is implemented by the one or more processing devices, and
   wherein the adjustment and construction steps are implemented by a remote computer.

13. A system configured to analyze the posture of a face, the system comprising:
   an acquisition device configured to acquire a plurality of representations of the face of an individual; and
   the one or more processing devices further configured to implement the method for constructing a model of the face in accordance with claim 1, using the acquisition device, and to extract, using the constructed model of the face, at least one parameter representative of a posture of the face from at least one of said representations.

14. A method for analyzing the posture of a face, the method comprising the following steps:
- acquiring a plurality of representations of the face of an individual;
- constructing a model of the face, through the method in accordance with claim 1, using said representations; and
- extracting, using the constructed model of the face, at least one parameter representative of a posture of the face on the basis of at least one of said representations.

15. The construction method as claimed in claim 2, wherein:
- the localization, adjustment, and construction steps are carried out a first time in order to determine, from said particular models determined in the localization step, first adjusted models and to construct a first model of said face of the individual,
- the adjustment step is carried out a second time, using said first model of the face of the individual as a reference model, in order to determine, for each particular model, a second model adjusted with respect to said reference model, and
- the construction step is carried out a second time on the basis of the second adjusted models obtained in the second adjustment step.

16. The construction method as claimed in claim 2, wherein the model of the face, the reference model, the particular models, and the adjusted models are three-dimensional, and
wherein the positions of the characteristic points are three-dimensional.

17. The construction method as claimed in claim 3, wherein the model of the face, the reference model, the particular models, and the adjusted models are three-dimensional, and
wherein the positions of the characteristic points are three-dimensional.

18. The construction method as claimed in claim 6, wherein, in the analysis step, each plurality of points characteristic of said face of the individual in each of said at least two two-dimensional images of the respective series is localized by a facial recognition method for recognizing said face of the individual.

19. The construction method as claimed in claim 2, wherein the barycenter is determined by weighting the positions of the given characteristic point in the multiple adjusted models with a corresponding weighting coefficient.

* * * * *